United States Patent [19]

Anthony et al.

[11] 4,444,828

[45] Apr. 24, 1984

[54] MULTILAYER TRASH BAG FILM

[75] Inventors: John Anthony, Downers Grove; Jerome T. Horner, Indian Head Park, both of Ill.

[73] Assignee: Union Carbide Corporation, Danbury, Conn.

[21] Appl. No.: 343,549

[22] Filed: Jan. 28, 1982

[51] Int. Cl.$^3$ .................. B32B 7/02; B32B 27/08; B32B 3/20

[52] U.S. Cl. .................. 428/218; 428/515; 428/514; 428/212; 428/35; 264/176 R

[58] Field of Search .............. 428/515, 516, 213, 216, 428/349, 35, 218, 212; 264/176 R

[56] References Cited

U.S. PATENT DOCUMENTS

| 3,694,524 | 9/1972 | Tinger et al. | 260/897 |
|---|---|---|---|
| 4,000,234 | 12/1976 | Pilgrim et al. | 264/95 |
| 4,076,698 | 2/1978 | Anderson et al. | 526/348.6 |
| 4,258,848 | 3/1981 | Akao et al. | 428/516 |
| 4,303,710 | 12/1981 | Bullard et al. | 428/516 |
| 4,356,221 | 10/1982 | Anthony et al. | 428/516 |
| 4,364,981 | 12/1982 | Horner et al. | 428/516 |
| 4,367,256 | 1/1983 | Biel | 428/516 |
| 4,399,173 | 8/1983 | Anthony et al. | 428/35 |

OTHER PUBLICATIONS

Kurtz et al., Ser. No. 210,593, 11-26-80.
Horner et al., Ser. No. 108,281, 12-28-79.
Fraser et al., Ser. No. 164,237, 6-30-80.
Fraser et al., Ser. No. 246,914, 3-23-81.

*Primary Examiner*—Marion McCamish
*Assistant Examiner*—B. Johnson
*Attorney, Agent, or Firm*—Real J. Grandmaison; John C. Lefever

[57] ABSTRACT

A multilayer plastic film suitable for use in the manufacture of garbage and trash bags wherein the film comprises one or more layers representing at least one first outer layer and may include a core layer made with low pressure, low density polyethylene and one or more layers representing at least one second outer layer made with high pressure, low density polyethylene which may contain up to forty-two percent by weight of low pressure, low density polyethylene.

16 Claims, No Drawings

MULTILAYER TRASH BAG FILM

This invention relates to a multilayer plastic film, and more particularly, to a multilayer plastic film suitable for the manufacture and use as garbage and trash bags.

In general, plastic garbage and trash bags for bulk waste material may be produced in film form from various polymers such as polyethylene. The films used for such bags should desirably possess high strength characteristics such as puncture toughness and tensile strength. Another desirable property of plastic bags is low manufacturing cost. It will be recognized that the required quantity of raw material may be reduced by use of polyethylene film having the previously mentioned high strength characteristics, and in part for this reason, multiple layer plastic films have been used to manufacture garbage bags.

With the introduction of linear low density polyethylenes made by the low pressure processes, attempts have been made to substitute this material for film applications in place of conventional highly branched low density polyethylenes made by high pressure processes. The reason for these efforts is that low pressure, low density polyethylene is widely recognized as being tougher and stronger than high pressure, low density polyethylene.

The prior art polyethylene film-type bags have thus been characterized by either limited strength properties with relatively low extruder power requirement and low extruder head pressure on one hand, or characterized by high strength properties and relatively high extruder power requirement and high extruder head pressure on the other hand.

In addition, polyethylene film for the production of consumer garbage and trash bags is generally prepared in the thickness range of between about 1.25 mils and about 3.0 mils. As earlier indicated, it is customary for low density polyethylene, produced by the standard high pressure process, to be used as the basic polymer or raw material for this product because of its relatively low cost, good physical properties, ease of extrusion at high rates, good heat seal strength, and ability to be readily converted into the finished product.

There is, however, a continuous need for stronger films for this application which will be even more resistant to damage by puncture or yielding under stress. A stronger film is not only desirable from the standpoint that the finished bag is more serviceable in the end-use, but also in that a thinner film can be used and still meet the necessary strength requirements, thus providing a better cost-performance relationship for the consumer.

It is also desirable to obtain a thinner bag that will function as a trash and garbage container at a performance level generally requiring a thicker bag to enable the manufacturer to produce the bag at a higher rate such that increased linear feet per unit of time results in lower cost and less resin is required per bag. Previous attempts employing linear low density polyethylene copolymers produced by the low pressure polymerization process to obtain the aforementioned benefits have been restricted due to their lower extensional viscosity, i.e., melt strength, after leaving the extrusion die and the bubble stability of the blown film is lower than with high pressure, low density polyethylene. As a result, the ability to air cool the extrudate of low pressure, low density polyethylene is lessened and consequently the output in pounds per hour is lower.

In accordance with this invention there is provided a multi-layer polyethylene film possessing improved puncture toughness and tensile strength over conventional multi-layer polyethylene films.

The multi-layer film is eminently suitable for use in the manufacture of garbage and trash bags which, in one embodiment, comprises a first outer layer of a low pressure, low density polyethylene; a core layer of low pressure, low density polyethylene; and a second outer layer comprising high pressure, low density polyethylene. It has been found that the multilayer film of this invention has physical properties, such as puncture toughness and tensile strength which are substantially improved over those of conventional multilayer films made from high pressure, low density polyethylene in all layers thereof or from blends of high pressure, low density polyethylene and low pressure, low density polyethylene.

Consequently, it has been found that a multilayered, coextruded film comprising the low pressure, low density polyethylene resins of this invention as one or more first outer layers, and high pressure, low density polyethylene or blends of high pressure, low density polyethylene containing up to about forty-two percent by weight of low pressure, low density polyethylene as one or more second outer layers of the co-extruded film results in a superior, stronger film and trash bag.

The multilayered structure having high pressure, low density polyethylene as a second outer layer is particularly desirable in order to gain freedom from melt fracture of the layer of low pressure, low density polyethylene at high output rates and to aid in increasing the melt strength of the extrudate in order to improve bubble or melt cooling at higher output rates.

The low pressure, low density polyethylene comprising one or more layers of the multilayer film of this invention comprises copolymers formed from ethylene and a comonomer selected from butene-1, pentene-1, hexene-1, heptene-1 and octene-1, and mixtures thereof. These copolymers may have a melt index of between about 0.5 and about 3.0 decigrams per minute. However, it is preferred that the copolymers have a melt index of between about 0.6 and about 1.2 decigrams per minute because as the melt index decreases, viscosity increases and extrusion becomes more difficult requiring more powerful extruders, and as melt index increases such results in a lowering of the physical properties of the film, notably tensile strength and puncture toughness energy. In addition, the copolymers may have a density of between about 0.916 and about 0.930 grams per cubic centimeter. The lower limit on density is primarily dictated by the ability to produce the polymers below that value. However, as the density increases machine direction tear strength is found to lessen. Thus, it is preferred that the copolymers have a density of between about 0.916 and about 0.920. Likewise, it is preferred that the low pressure, low density polyethylene comprise a copolymer of ethylene and butene-1.

The high pressure, low density polyethylene employed in this invention may have a melt index of between about 0.5 and about 5.0 decigrams per minute, and a density of between about 0.916 and about 0.930. However, it is preferred that the high pressure, low density polyethylene have a melt index of between about 1 to 3 decigrams per minute and a density of between about 0.916 and about 0.924.

In addition to the improved physical properties of the multilayer film of this invention being predicated on the particular low pressure, low density polyethylene copolymers employed herein, the thickness ratio of low pressure, low density polyethylene layer or layers to high pressure, low density polyethylene layer or layers is also a major contributing factor. More specifically, it has been found that by decreasing the thickness ratio of the low pressure, low density polyethylene with a corresponding increase of the high pressure, low density polyethylene reduces the desirable physical properties of the resulting film. By increasing the thickness ratio of the low pressure, low density polyethylene to that of the high pressure, low density polyethylene it is found that melt strength and bubble stability of the extrudate is decreased. Therefore, in order to maintain high production rates and retain desired physical properties in the final product, a preferred layer : layer thickness ratio of 2:1 for the low pressure, low density polyethylene and the high pressure, low density polyethylene, respectively, should be employed. However, the layer: layer thickness ratio for the first outer layer, and the first outer layer and core layer where such is present, to the second outer layer may be between 1:1 and 2:1.

Further, the multilayer film composition of this invention may comprise a first outer layer of low pressure, low density polyethylene copolymer and a second outer layer comprising high pressure, low density polyethylene or a blend of high pressure, low density polyethylene and said aforementioned copolymer. When so constructed, it is preferred that said first film layer comprise up to about 67 percent of the total thickness of the multilayer film and said second film layer may comprise the remaining thickness of the total thickness of the multilayer film. In similar fashion, the multilayer film composition of this invention may comprise a first outer layer of low pressure, low density polyethylene to which a colorant selected from a pigment or dye such as green or black may be added; a core layer comprising low pressure, low density polyethylene copolymers; and a second outer layer comprising high pressure, low density polyethylene or a blend of said high pressure, low density polyethylene and said low pressure, low density polyethylene copolymers to which a colorant has been added. When so constructed, it is preferred that said first outer layer and core layer comprise up to about 67 percent of the total thickness of the multilayer film, and said second outer layer comprise the remaining thickness of the total thickness of the multilayer film.

Further, the multilayer film composition of this invention may comprise a first outer layer of low pressure, low density polyethylene containing up to about three percent by weight of high pressure, low density polyethylene and a colorant selected from a pigment or dye such as green in color, and a second outer layer comprising high pressure, low density polyethylene containing up to about forty-two percent by weight of low pressure, low density polyethylene.

Further still, the multilayer film composition of this invention may comprise a first outer layer of low pressure, low density polyethylene, a core layer comprising one or more layers wherein at least one of the layers comprises low pressure, low density polyethylene, and a second outer layer comprising high pressure, low density polyethylene or blends of high pressure, low density polyethylene containing up to about forty-two percent by weight of low pressure, low density polyethylene.

The multilayer film composition of this invention is preferably prepared by simultaneously coextruding one or more layers of low pressure, low density polyethylene and one or more layers of high pressure, low density polyethylene which may contain up to about forty-two percent by weight of low pressure, low density polyethylene. Coextrusion of the multilayer film composition has been found to result in substantial reduction of melt fracture events due to the presence of the high pressure, low density polyethylene which also contributes melt strength to the extruded product and allows higher output rates due to improved air cooling properties. Where the amount of low pressure, low density polyethylene present in the layer of high pressure, low density polyethylene exceeds forty-two percent by weight, such results in a substantial decrease of melt strength, bubble stability and output rate of the film.

In addition, extrusion through narrow die gaps on the order of 30 to 50 mils provides multilayer films having more balanced physical properties. More specifically, the machine direction properties of the films are not vastly different from the transverse direction properties of the films. This is particularly important in garbage and trash bag production where each bag is generally side-sealed such that the bottom of the bag is the side fold of the blown film tubing. In this event, the transverse direction of the blown film becomes the lift direction of the bag.

The total thickness of the multilayer film is generally between about 1 mil and about 3 mils. Substantially thinner films would usually not be suitable because the strength properties of the film would be unacceptably low for use as a trash or garbage bag. Films substantially thicker than 3 mils are not preferred since the additional strength associated with thicker material is ordinarily not required for trash-garbage bag usage. A further disadvantage of thicker films would be difficulty in handling and tying the bag open end. A preferred balance of these opposing considerations is a film between about 1.3 and 1.8 mils thick.

Illustrative, non-limiting examples of the features and practice of the invention are set out below. The parts and percentages set forth herein refer to parts by weight and percentages by weight, respectively, unless specifically stated otherwise.

In the following examples, the sample multilayer films were formed by co-extrusion of the film layers through a tubular die.

Further, the multilayer film samples represented in Table I had the following material compositions. Sample A comprised a two-layer product wherein both layers were made from high pressure, low density polyethylene having a melt index of about 2 decigrams per minute and a density of about 0.92. Sample B comprised a three-layer product wherein the first outer layer and the core layer were made from high pressure, low density polyethylene having a melt index of about 2 and a density of.about 0.92, containing about 18% by weight of low pressure, low density polyethylene having a melt index of about 1 and a density of about 0.92, and the second outer layer, i.e., inner layer, was made from the aforementioned high pressure, low density polyethylene.

Sample C comprised a three-layer product in accordance with this invention wherein the first outer layer and a core layer were made from a low pressure, low density polyethylene copolymer comprising ethylene and butene-1. The copolymer had a melt index of about 1 decigram per minute and a density of about 0.92. The second outer layer, or inner layer, was made from a blend of high pressure, low density polyethylene containing about forty-two percent by weight of low pressure, low density polyethylene material as in the first outer layer. The high pressure, low density polyethylene had a melt index of about 2 decigrams per minute and a density of about 0.92.

For comparative purposes, the thickness of the multilayer film compositions of Samples A, B and C was 1.5 mils. The multilayer film compositions were produced on blown film extrusion lines at a film manufacturing plant. The first outer layer of Samples A, B and C and the core layer die paths of Samples B and C were supplied by a 6 inch single screw extruder. The second outer, or inner, layer die path of Samples A, B and C was supplied by a 4½ inch single screw machine operated at between about 90 and about 100 r.p.m. screw speed and about 6,000 p.s.i. head pressure. The screw speed of the 6 inch extruder which fed Samples A and B was 70 r.p.m. at a head pressure of 4500 psi. The screw speed of the 6 inch extruder which fed the first outer and core layer of Sample C was between 50 and 55 r.p.m., at a head pressure of about 7,500 p.s.i. The die lip gap for Samples A, B and C was approximately 40 mils. The discharge from the die was air blown into a multilayer film having a 108 inch flat width.

The physical properties of the film of Samples A, B and C were examined and the results are summarized in Table I. From the results shown in Table I, it can be seen that the multilayer film composition of the present invention, that is, Sample C provides a substantial level of improvement in desired physical properties. More particularly, machine direction tensile strength and transverse direction tensile strength are significantly increased while there is a dramatic improvement in puncture toughness, especially with respect to energy.

TABLE I

|  | Sample A | Sample B | Sample C |
|---|---|---|---|
| Tensile strength (psi) |  |  |  |
| machine direction | 3072 | 3064 | 3682 |
| transverse direction | 2248 | 2327 | 3092 |
| Puncture toughness |  |  |  |
| Load (lb.) | 7.18 | 7.94 | 9.57 |
| Energy (in-lb.) | 5.93 | 7.49 | 16.99 |

Further, in Table I, the following test criteria were used. Tensile strength was measured by ASTM D882 method A.

Puncture toughness is a test originated to evaluate the relative resistance of a film to being punctured. There is no ASTM standard. Basically, a ¾ inch round steel plunger is pushed through a clamped film specimen at a speed of 20 inches per minute using a modified Instron Tester. The load to puncture of the film specimen is recorded in pounds and the energy to puncture is the integrated area under the load-elongation curve and is recorded in inch-pounds (inch-lbs).

Melt index was determined by ASTM D1238 Condition E-measured at 190° C. and reported as grams per 10 minutes.

It is also to be noted that the multilayer film compositions of this invention may contain conventional pigments, anti-oxidants, slip agents and anti-block agents as well as small amounts, for example, up to about 5 percent by weight of a resin component present as the vehicle or carrier for the aforementioned materials as may be provided from a masterbatch thereof.

Although preferred embodiments of this invention have been described in detail, it is contemplated that modifications thereof may be made and that some features may be employed without others, all within the spirit and scope of the invention. For example, although the films described in the foregoing examples were prepared by blown film extrusion, other preparative methods may be used as, for example, slot cast extrusion.

We claim:

1. A multilayer film having a first outer layer consisting essentially of low pressure, low density polyethylene, a core layer consisting essentially of low pressure, low density polyethylene, and a second outer layer consisting essentially of high pressure, low density polyethylene, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

2. A multilayer film as in claim 1 wherein said low pressure, low density polyethylene comprises a copolymer formed from ethylene and a comonomer selected from butene-1, pentene-1, hexene-1, heptene-1 and octene-1.

3. A multilayer film as in claim 1 wherein said low pressure, low density polyethylene has a melt index of between about 0.6 and about 1.2 decigrams per minute.

4. A multilayer film as in claim 1 wherein said high pressure, low density polyethylene has a melt index of between about 1 to 3 decigrams per minute and a density of between about 0.916 and about 0.924 grams per cubic centimeter.

5. A multilayer film as in claim 1 wherein said low pressure, low density polyethylene comprises a copolymer of ethylene and butene-1.

6. A multilayer film as in claim 1 wherein the thickness ratio of said first outer layer and said core layer to said second outer layer is between about 1:1 and 2:1.

7. A multilayer film as in claim 1 wherein the thickness ratio of said first outer layer and said core layer to said second outer layer is about 2:1.

8. A multilayer film having a first outer layer consisting essentially of low pressure, low density polyethylene copolymer, and a second outer layer consisting essentially of high pressure, low density polyethylene or a blend of said high pressure, low density polyethylene and up to about forty-two percent by weight of said low pressure, low density polyethylene based on the weight of the blend, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

9. A multilayer film as in claim 8 wherein said first outer layer comprises up to about 67 percent of the total thickness of said multilayer film.

10. A multilayer film as in claim 8 wherein said first outer layer and said second outer layer may contain a colorant.

11. A multilayer film as in claim 8 wherein the total thickness of said multilayer film in between about 1 mil and about 3 mils.

12. A multilayer film having a first outer layer consisting essentially of low pressure, low density polyethylene, a core layer consisting essentially of low pressure, low density polyethylene, and a second outer layer consisting essentially of a blend of high pressure, low density polyethylene and up to about forty-two percent by weight of low pressure, low density polyethylene based on the weight of said blend, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

13. A method of preparing a multilayer film comprising co-extruding a first outer layer consisting essentially of low pressure, low density polyethylene, a core layer consisting essentially of low pressure, low density polyethylene, and a second outer layer consisting essentially of high pressure, low density polyethylene, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

14. A method of preparing a multilayer film comprising co-extruding a first outer layer consisting essentially of low pressure, low density polyethylene copolymer, and a second outer layer consisting essentially of high pressure, low density polyethylene, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

15. A method of preparing a multilayer film comprising co-extruding a first outer layer consisting essentially of low pressure, low density polyethylene, a core layer consisting essentially of low pressure, low density polyethylene, and a second outer layer consisting essentially of a blend of high pressure, low density polyethylene and up to about forty-two percent by weight of low pressure, low density polyethylene based on the weight of said blend, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

16. A method of preparing a multilayer film comprising co-extruding a first outer layer consisting essentially of low pressure, low density polyethylene, a core layer having one or more layers wherein at least one of said layers consists essentially of low pressure, low density polyethylene, and a second outer layer consisting essentially of high pressure, low density polyethylene or a blend of said high pressure, low density polyethylene containing up to about forty-two percent by weight of low pressure, low density polyethylene based on the weight of said blend, said low pressure, low density polyethylene having a melt index of between about 0.5 and about 3.0 decigrams per minute and a density of between about 0.916 and about 0.930 grams per cubic centimeter, and said high pressure, low density polyethylene having a melt index of between about 0.5 and about 5.0 decigrams per minute and a density of between about 0.916 and about 0.930 grams per cubic centimeter.

* * * * *